United States Patent
Sonohara

(10) Patent No.: US 8,093,769 B2
(45) Date of Patent: Jan. 10, 2012

(54) COOLING STRUCTURE FOR ROTATING ELECTRIC MACHINE

(75) Inventor: Tomoka Sonohara, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 239 days.

(21) Appl. No.: 12/663,365

(22) PCT Filed: Jun. 12, 2008

(86) PCT No.: PCT/JP2008/061188
§ 371 (c)(1),
(2), (4) Date: Dec. 7, 2009

(87) PCT Pub. No.: WO2008/156127
PCT Pub. Date: Dec. 24, 2008

(65) Prior Publication Data
US 2010/0218918 A1   Sep. 2, 2010

(30) Foreign Application Priority Data
Jun. 13, 2007  (JP) .................................. 2007-156352

(51) Int. Cl.
*H02K 9/00* (2006.01)
(52) U.S. Cl. ........... 310/54; 310/260; 310/194; 310/214
(58) Field of Classification Search .................... 310/54, 310/58, 59, 179, 180, 194, 214, 215, 260
See application file for complete search history.

(56) References Cited

U.S. PATENT DOCUMENTS

| 2,390,130 | A | * | 12/1945 | Sigmund et al. | 310/54 |
| 3,463,952 | A | * | 8/1969 | Norris | 310/58 |
| 6,137,202 | A | * | 10/2000 | Holmes et al. | 310/180 |
| 6,856,053 | B2 | * | 2/2005 | LeFlem et al. | 310/54 |
| 6,927,510 | B1 | * | 8/2005 | Beitelman et al. | 310/54 |
| 7,514,826 | B2 | * | 4/2009 | Wakita | 310/54 |
| 2005/0151429 | A1 | * | 7/2005 | Taketsuna et al. | 310/54 |
| 2006/0145548 | A1 | | 7/2006 | Wakita | |
| 2006/0163954 | A1 | * | 7/2006 | Biais | 310/54 |

FOREIGN PATENT DOCUMENTS

| JP | 2004-248429 A | 9/2004 |
| JP | 2004-343877 A | 12/2004 |
| JP | 2005-304244 A | 10/2005 |
| JP | 2006-014530 A | 1/2006 |
| JP | 2006-042500 A | 2/2006 |
| JP | 2007-043813 A | 2/2007 |
| JP | 2007-104783 A | 4/2007 |

* cited by examiner

*Primary Examiner* — Quyen Leung
*Assistant Examiner* — Naishadh Desai
(74) *Attorney, Agent, or Firm* — Sughrue Mion, PLLC

(57) ABSTRACT

A rotating electric machine including an edgewise coil formed of a rectangular wire is efficiently cooled. The edgewise coil is formed by winding the rectangular wire around a tooth. In order to wind the rectangular wire around the tooth of rectangular shape, supporting portions determining the position of the edgewise coil relative to the tooth are provided. A coolant flows through a cooling water channel provided between the tooth and the edgewise coil formed of the rectangular wire and positioned by the supporting portions.

6 Claims, 12 Drawing Sheets

F I G. 1
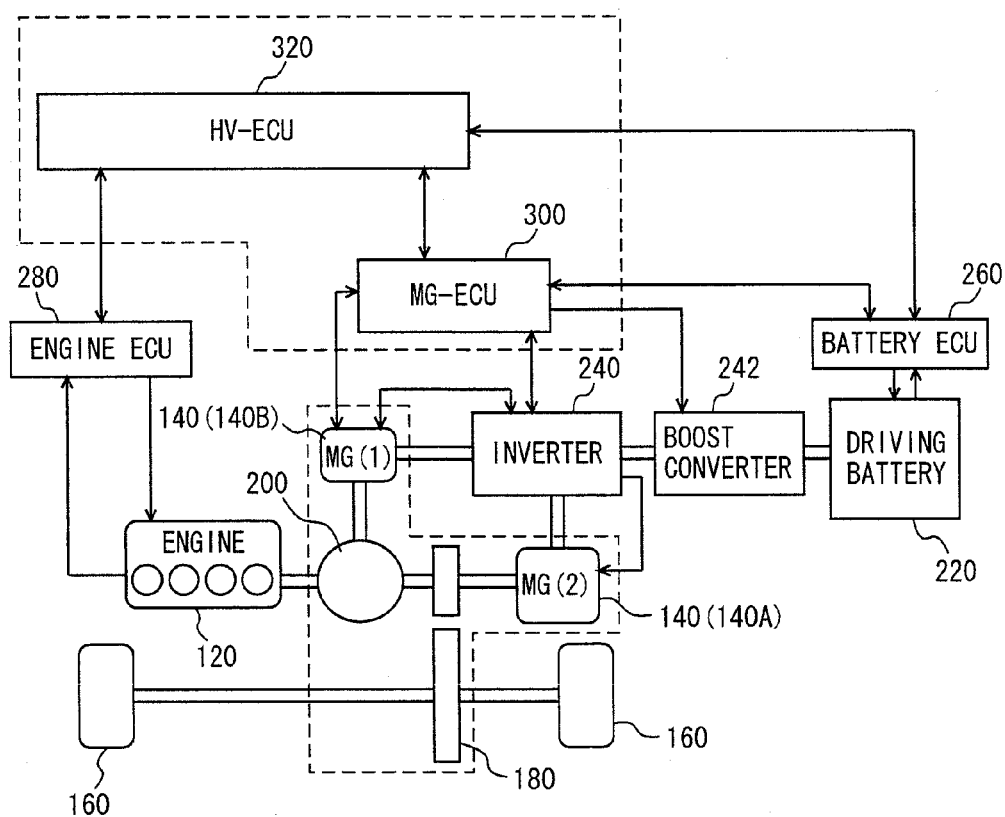

F I G. 6
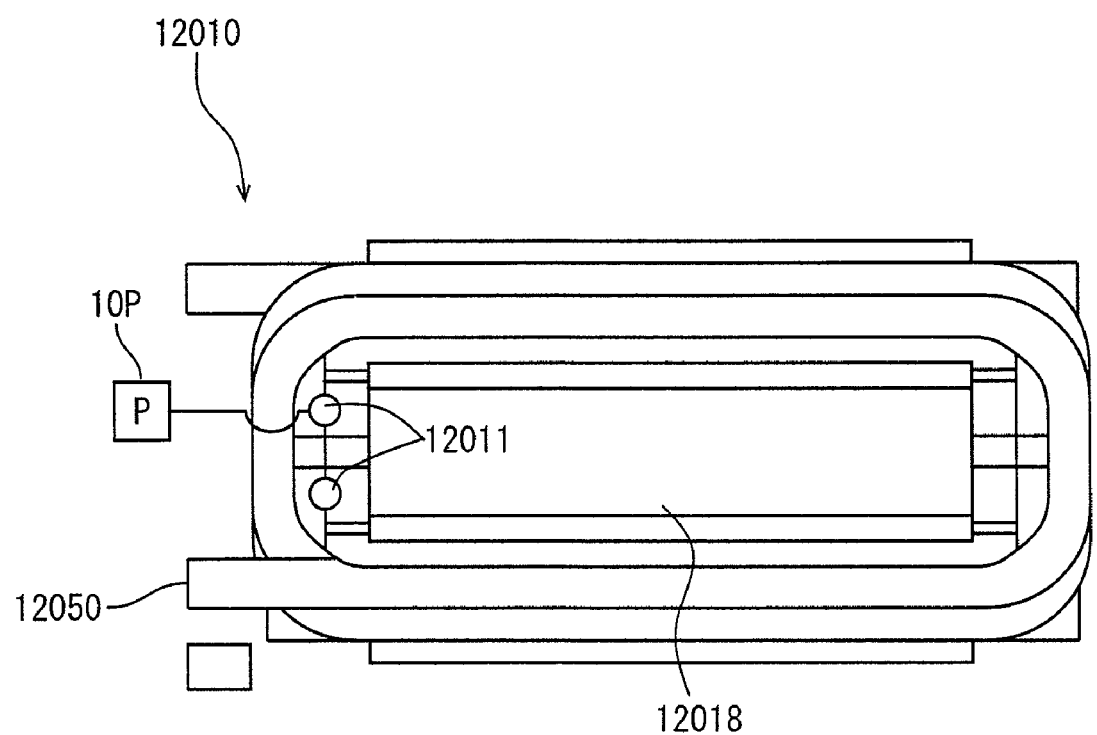

F I G. 7
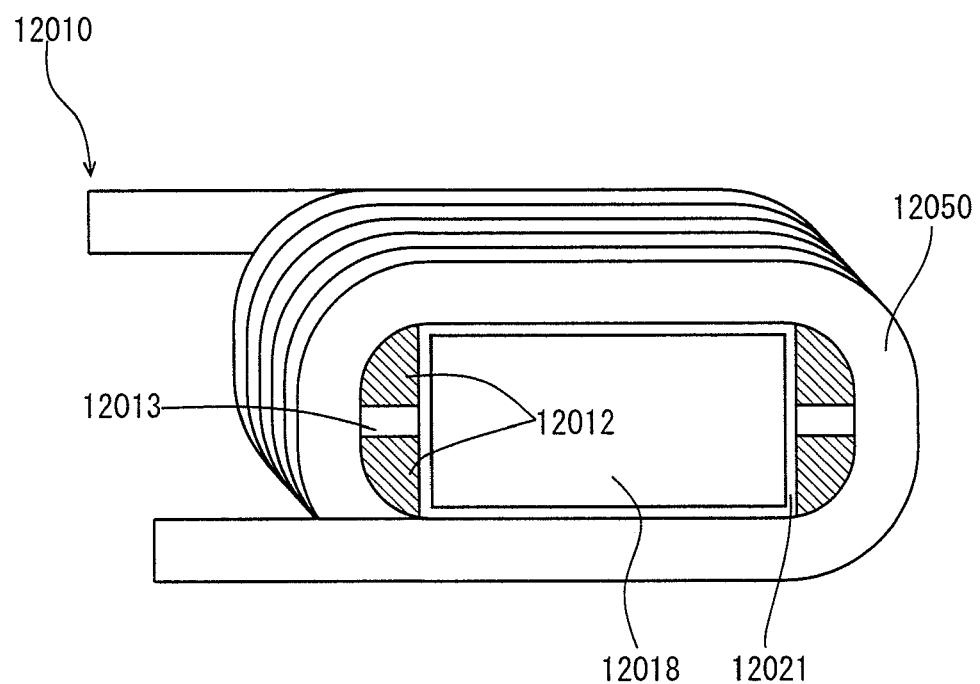

F I G. 1 2
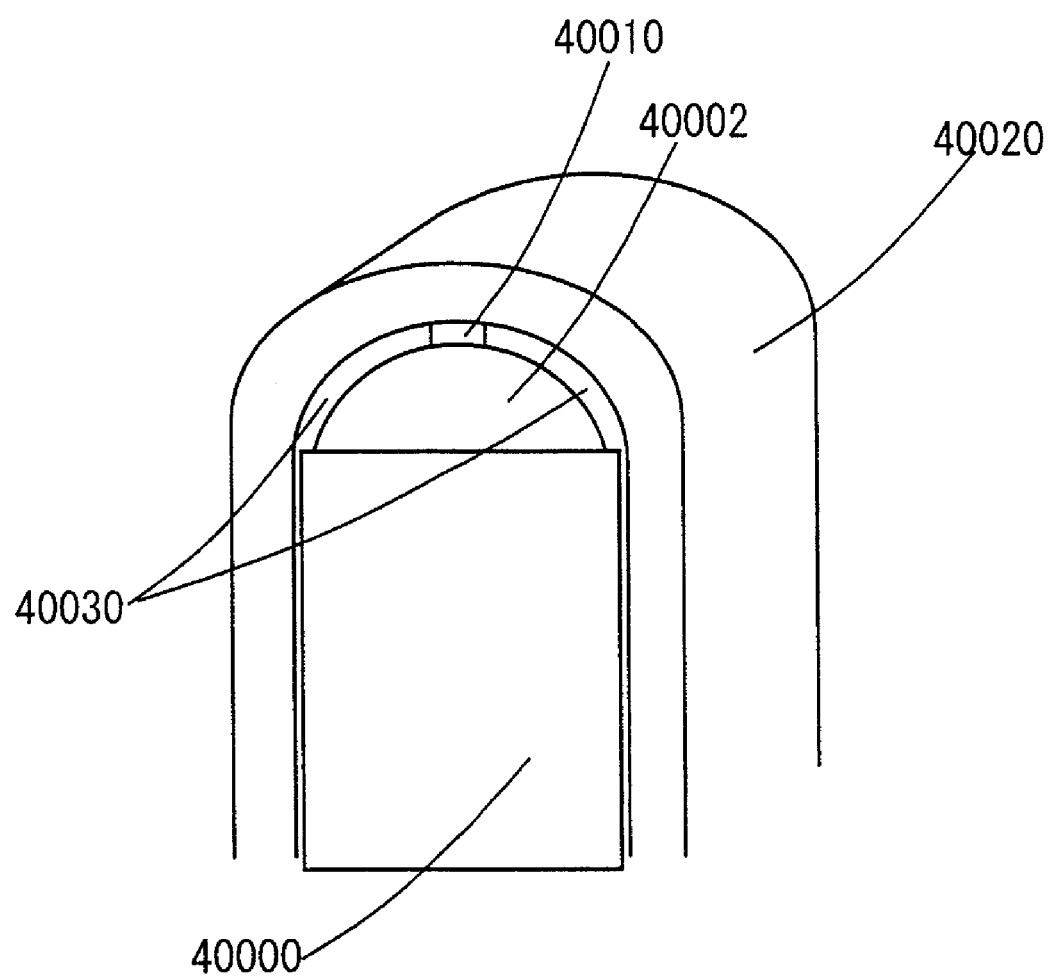

COOLING STRUCTURE FOR ROTATING ELECTRIC MACHINE

TECHNICAL FIELD

The present invention relates to a structure for a rotating electric machine mounted on a vehicle, and more particularly to a structure for a rotating electric machine including an edgewise coil formed of a rectangular wire.

BACKGROUND ART

As a rotating electric machine operates, the wire of a coil generates heat to raise the temperature. It is known that a failure to sufficiently cool the wire reduces the output of the rotating electric machine and degrades the durability of the wire.

A rectangular wire is in some cases used for a stator winding of such a rotating electric machine to form an edgewise coil. With such a rectangular wire, the coil has a larger cross-sectional area than with a usual round wire, resulting in a reduced direct-current resistance, improved frequency characteristics, and the like. Accordingly, the coil can be reduced in size and improved in performance.

However, the rectangular wire shows a great radius of curvature when making turns, where the wire is likely to leave large gaps from a tooth of a stator (iron core) of the rotating electric machine. Specifically, when winding the rectangular wire around a wind region having a rectangular cross section of an insulating member which covers the iron core, it is difficult to wind the wire in an exact rectangular shape. The wire is inevitably lifted up from the sides of the rectangle while being in contact with the corners, resulting in gaps between the wire and the sides of the rectangle. The gaps, acting as a heat insulating space, raise the problem in that heat generated by the wire is less likely to be transmitted to the iron core through the insulating material, resulting in degraded cooling performance of the wire even if the iron core is cooled.

In light of such a drawback, Japanese Patent Laying-Open No. 2004-343877 (Patent Document 1) discloses coils of a rotating electric machine whose wires can be cooled efficiently with a simple structure. Each coil of the rotating electric machine has a wire wound in multiple layers around a wind region of an insulating member which covers the iron core, and is characterized in that gaps between the wind region of the insulating member and the wire are filled with a thermal conductive material supplied through a channel formed in the insulating member.

With the coils of the rotating electric machine in which the gaps provided between the wind region of the insulating member which covers the iron core and the wire wound around the wind region are filled with a thermal conductive material supplied through the channel formed in the insulating member, transmission of heat of the wire to the iron core through the thermal conductive member and the insulating member allows effective dissipation of the heat to cool the wire. Further, there is no need to provide a coolant, a pump for circulation thereof or the like, which contributes to reduced costs.

DISCLOSURE OF THE INVENTION

However, the coil of the rotating electric machine disclosed in Patent Document 1 mentioned above is not directly cooled, but merely indirectly cooled by transmission of a greater amount of heat of the coil (wire) to the iron core. This may cause insufficient cooling of the rectangular wire.

The present invention was made to solve the above-described problem. It is an object of the present invention to provide a cooling structure for a rotating electric machine that allows efficient cooling of the rotating electric machine including an edgewise coil formed of a rectangular wire.

A cooling structure for a rotating electric machine according to a first aspect is intended for cooling a rotating electric machine including a plurality of coils with a rectangular wire wound in multiple layers around an insulating member circumferentially covering an iron core. The cooling structure has, in each of the coils, a gap between the insulating member and the rectangular wire provided due to a great radius of curvature of the rectangular wire at turns, and includes supply means for supplying a cooling medium to flow through the gap.

According to the first aspect, the plurality of coils are formed in accordance with the number of poles of the rotating electric machine. The coils are each formed by winding the rectangular wire in multiple layers around the insulating member which circumferentially covers the iron core. Due to a great radius of curvature of the rectangular wire at turns, it is difficult to wind the rectangular wire around the insulating member which circumferentially covers the rectangular iron core (tooth) with no gaps therebetween (to wind the rectangular wire having a rectangular cross section into rectangle with no gaps therebetween), which inevitably results in a gap between the insulating member and the rectangular wire. The supply means supplies a cooling medium through the gap, so that the gap serves as a channel of the cooling medium. Unlike the conventional technique of incorporating a thermal conductive member into the gap to indirectly improve the cooling efficiency, the supply of the cooling medium through the gap allows direct cooling of the iron core. As a result, a cooling structure of a rotating electric machine can be provided that allows efficient cooling of the rotating electric machine including a (edgewise) coil formed of a rectangular wire.

In a cooling structure for a rotating electric machine according to a second aspect, the cooling medium flows from one of the coils to another coil, in addition to the structure according to the first aspect.

According to the second aspect, when the rotational shaft of the rotating electric machine is placed horizontally, for example, a coolant is supplied to an uppermost stator coil. The cooling medium flows by gravity to an adjacent coil. This continues successively, so that the plurality of coils can be cooled.

A cooling structure for a rotating electric machine according to a third aspect further includes an insulating material which reduces a cross-sectional area of the gap, in addition to the structure according to the first or second aspect.

According to the third aspect, a reduction in the cross-sectional area of the gap increases the flow rate of the cooling medium (herein, liquid). This further promotes heat exchange, achieving improved cooling efficiency.

In a cooling structure for a rotating electric machine according to a fourth aspect, the supply means includes a channel supplying the cooling medium to a hole communicating with the gap, and a pump causing the cooling medium to flow through the channel, in addition to the structure according to one of the first and second aspects.

According to the fourth aspect, the coolant is supplied through the gap of the coil of the rotating electric machine by means of the pump, and the coolant having absorbed heat is supplied to a radiator. The rotating electric machine can thereby be cooled efficiently.

BRIEF DESCRIPTION OF THE DRAWINGS

FIG. 1 is an overall control block diagram of a hybrid vehicle including motor generators according to an embodiment of the present invention.

FIG. 6 is a partial enlarged view corresponding to FIG. 5.

FIG. 7 is a sectional view corresponding to FIG. 6.

FIG. 12 is a partial sectional perspective view of a motor generator according to a modification of the embodiment of the present invention.

BEST MODES FOR CARRYING OUT THE INVENTION

Figure 2:
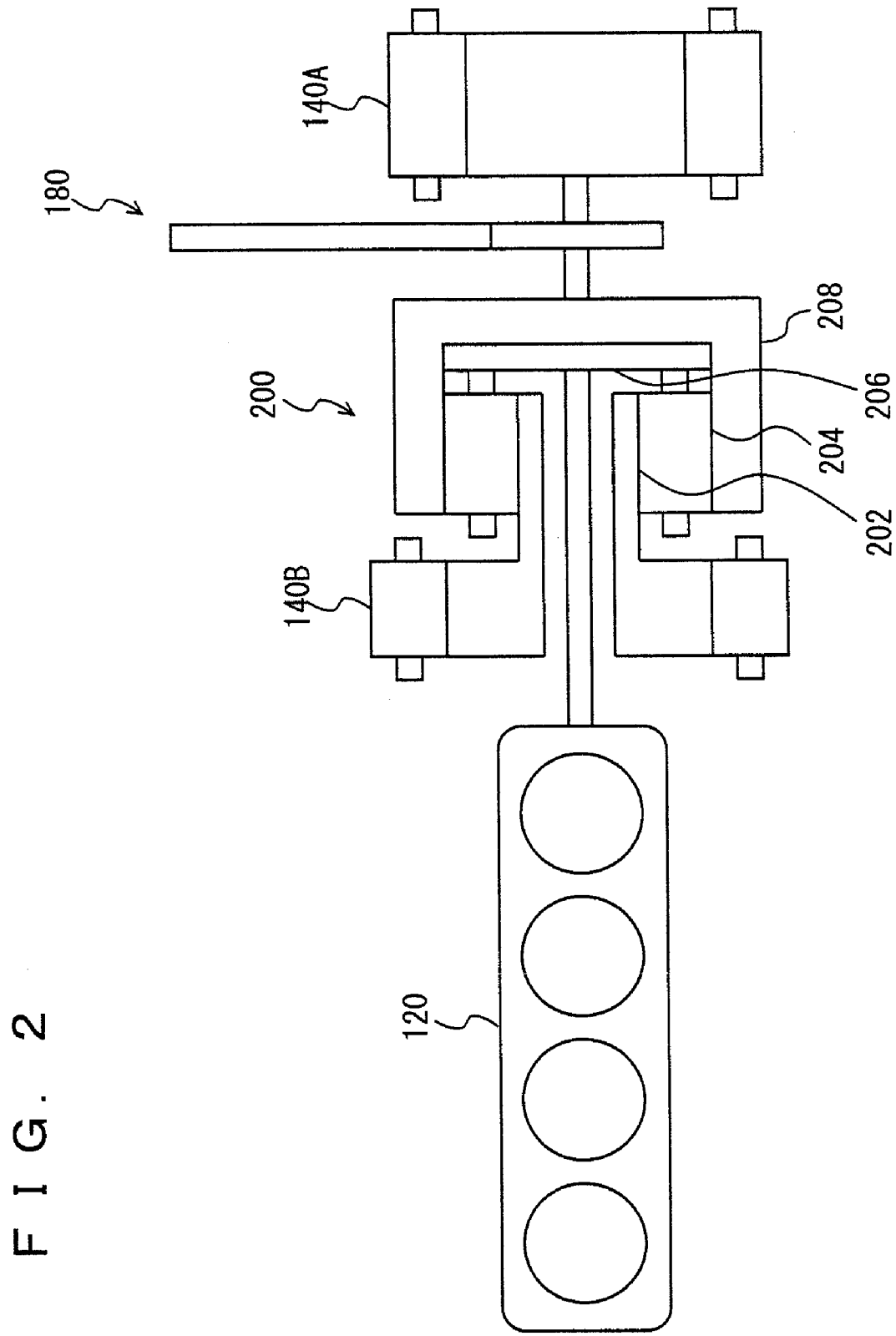
FIG. 2 shows a power split mechanism.

Embodiments of the present invention will be described hereinbelow with reference to the drawings. In the following description, like parts are denoted by like reference characters, and are identical in name and function as well. Therefore, detailed description thereof will not be repeated. It is to be noted that the aspect ratio and the like may be varied among the drawings. This is intended to show that the present invention is not applied to a motor generator limited to a particular aspect ratio.

With reference to FIG. 1, a description of an overall control block diagram of a hybrid vehicle including motor generators having a cooling structure according to an embodiment of the present invention will be presented. It is to be noted that the present invention is not limited to the hybrid vehicle shown in FIG. 1. The present invention may be applied to a vehicle whose internal combustion engine as a power source, such as a gasoline engine (hereinafter referred to as an engine), serves both as a driving source for driving the vehicle and as a driving source of a generator. The present invention may alternatively be applied to a vehicle that is powered by the engine and a motor generator, and that can run by means of power of the motor generator (either with or without the engine turned off), or a hybrid vehicle having a different mode in which a battery for driving is mounted (not limited to the so-called series or parallel hybrid vehicles, but limited to vehicles that can perform EV running after system activation). The battery may be implemented by, for example, a nickel-metal hydride battery or a lithium ion battery, and the type thereof is not particularly limited. Alternatively, the battery may be replaced by a capacitor. The motor generator having the cooling structure according to the embodiment of the present invention may also be applicable to an electric vehicle with no engine mounted thereon.

The hybrid vehicle includes an engine 120 and a motor generator (MG) 140. For the sake of convenience, motor generator 140 will be expressed below as a motor generator 140A (or MG(2) 140A) and a motor generator 140B (or MG(1) 140B). However, depending on the running state of the hybrid vehicle, motor generator 140A may serve as a generator, and motor generator 140B may serve as a motor. When the motor generator serves as a generator, regenerative braking is performed. When the motor generator serves as a generator, the kinetic energy of the vehicle is converted into electric energy, resulting in deceleration of the vehicle.

The hybrid vehicle also includes a speed reducer 180 for transmitting power generated by engine 120 and/or motor generator 140 to a driven wheel 160 and for transmitting the driving of driven wheel 160 to engine 120 and motor generator 140, a power split mechanism (e.g., a planetary gear mechanism to be described later) 200 distributing the power generated by engine 120 to two paths to driven wheel 160 and motor generator 140B (MG(1) 140B), a driving battery 220 for accumulating electric power for driving motor generator 140, an inverter 240 for performing current control while converting between a direct current of driving battery 220 and an alternating current of motor generator 140A (MG(2) 140A) and motor generator 140B (MG(1) 140B), a battery control unit (hereinafter referred to as a battery ECU (Electronic Control Unit)) 260 for managing and controlling the state of charge or discharge (e.g., SOC) of driving battery 220, an engine ECU 280 for controlling the operating condition of engine 120, an MG-ECU 300 for controlling motor generator 140, battery ECU 260, inverter 240 and the like in accordance with the state of the hybrid vehicle, an HV-ECU 320 for managing and controlling battery ECU 260, engine ECU 280, MG-ECU 300 and the like interactively, to control the overall hybrid system such that the hybrid vehicle can run at optimum efficiency, and the like.

In the present embodiment, a boost converter 242 is provided between driving battery 220 and inverter 240. Since the rated voltage of driving battery 220 is lower than that of motor generator 140A (MG(2) 140A) and motor generator 140B (MG(1) 140B), boost converter 242 boosts electric power before supplying the electric power to motor generator 140A (MG(2) 140A) and motor generator 140B (MG(1) 140B) from driving battery 220.

Although the respective ECUs are provided separately in FIG. 1, two or more ECUs may be integrated into an ECU (by way of example, MG-ECU 300 and HV-ECU 320 may be integrated into an ECU, as shown in dotted lines in FIG. 1).

Power split mechanism 200 is implemented by a planetary gear mechanism (planetary gear) in order to distribute the power of engine 120 to both driven wheel 160 and motor generator 140B (MG(1) 140B). By controlling the number of revolutions of motor generator 140B (MG(1) 140B), power split mechanism 200 also serves as a continuously variable transmission. The rotational force of engine 120 is received by a carrier (C) to be transmitted to motor generator 140B (MG(1) 140B) by a sun gear (S) and to motor generator 140A (MG(2) 140A) and an output shaft (at driven wheel 160 side) by a ring gear (R). For turning off rotating engine 120, the kinetic energy of the rotation of rotating engine 120 is converted into electric energy at motor generator 140B (MG(1) 140B) to reduce the number of revolutions of engine 120.

In a hybrid vehicle equipped with a hybrid system as shown in FIG. 1, when conditions predetermined with respect to the state of the vehicle are satisfied, HV-ECU 320 controls engine 120 through motor generator 140A (MG(2) 140A) and engine ECU 280 such that the hybrid vehicle runs only by means of motor generator 140A (MG(2) 140A) of motor generator 140. For example, the predetermined conditions include a condition that driving battery 220 has an SOC of a predetermined value or above. With such control, the hybrid vehicle can be driven only by means of motor generator 140A (MG(2) 140A) when engine 120 operates with low efficiency at the start of driving, during low speed running or the like. As a result, the SOC of driving battery 220 can be reduced (driving battery 220 can be charged at a subsequent stop of the vehicle).

At a normal running state, the power of engine 120 is split by power split mechanism 200 to two paths, so that driven wheel 160 is driven directly, while motor generator 140B (MG(1) 140B) is driven for power generation. At this stage, motor generator 140A (MG(2) 140A) is driven by means of the generated electric power to assist driving of wheel 160. During high speed running, the electric power from driving battery 220 is further supplied to motor generator 140A (MG(2) 140A) to increase the output of motor generator 140A (MG(2) 140A), so that additional driving force is given to driven wheel 160. At deceleration, motor generator 140A (MG(2) 140A) operating following driven wheel 160 serves as a generator to perform regeneration, and recovered electric power is stored in driving battery 220. When driving battery 220 has a reduced amount of charge and particularly requires charging, the output of engine 120 is increased to increase the amount of power generation of motor generator 140B (MG(1) 140B), thereby increasing the amount of charge of driving battery 220.

Further, a target SOC of driving battery 220 is usually set at about 60% such that energy can be recovered whenever regeneration is performed. In order to prevent driving battery 220 from degrading, the upper and lower limits of SOC are set at 80% and 30%, respectively. HV-ECU 320 controls, through MG-ECU 300, power generation and regeneration by motor generator 140 as well as motor outputs such that the SOC does not exceed the upper limit and fall below the lower limit. The values mentioned herein are mere examples, and are not intended to be limitative values.

With reference to FIG. 2, power split mechanism 200 will be described further. Power split mechanism 200 is implemented by a planetary gear including a sun gear (S) 202 (hereinafter briefly referred to as sun gear 202), a pinion gear 204, a carrier (C) 206 (hereinafter briefly referred to as carrier 206) and a ring gear (R) 208 (hereinafter briefly referred to as ring gear 208).

Pinion gear 204 engages with sun gear 202 and ring gear 208. Carrier 206 supports pinion gear 204 in a rotatable manner. Sun gear 202 is coupled to the rotation shaft of MG(1) 140B. Carrier 206 is coupled to the crankshaft of engine 120. Ring gear 208 is coupled to the rotation shaft of MG(2) 140A and speed reducer 180.

Coupling engine 120, MG(1) 140B and MG(2) 140A to one another by means of power split mechanism 200 implemented by the planetary gear brings engine 120, MG(1) 140B and MG(2) 140A into a relationship in which their numbers of revolutions are connected with a straight line in a nomographic chart.

Figure 3:
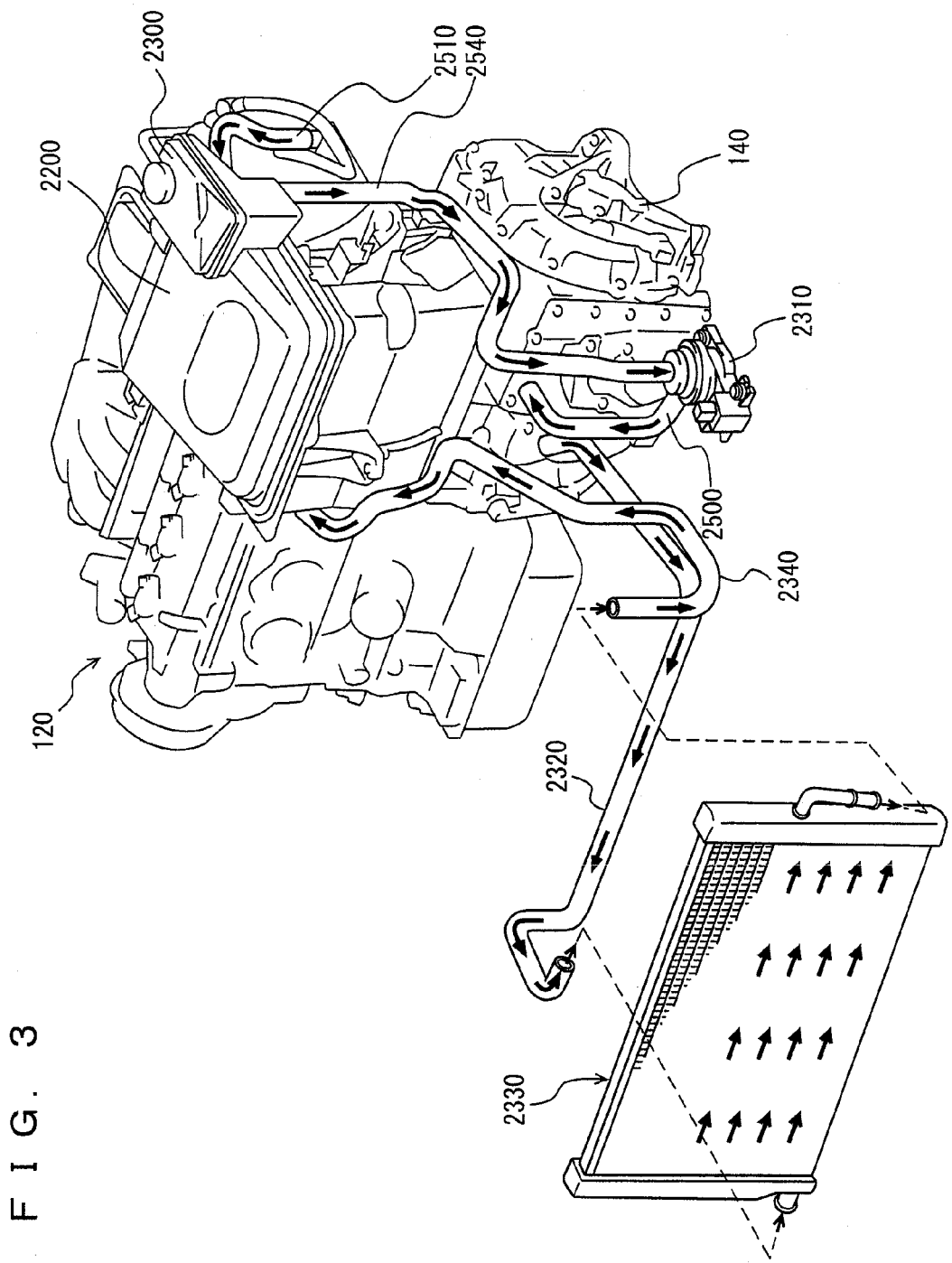
FIG. 3 is an overall structural diagram of a cooling system of a hybrid vehicle.

With reference to FIG. 3, the overall structure of a hybrid cooling system including motor generator 140 having the cooling structure according to the embodiment of the present invention will now be described. As shown in FIG. 3, this hybrid cooling system (hereinafter briefly referred to as a cooling system as well) is a system in which cooling water (LLC (Long Life Coolant) as a cooling medium) as a liquid coolant flows from/to motor generator 140 and a PCU 2200 to/from an HV radiator 2330 by means of an HV water pump 2310 to cool motor generator 140 and PCU 2200.

In addition to the above-mentioned HV-water pump 2310 and HV radiator 2330, the cooling system includes an HV-radiator-destined pipe 2320 for feeding high-temperature cooling water having absorbed heat at motor generator 140 and PCU 2200, an HV-radiator-return pipe 2340 for returning, from HV radiator 2330, cooling water having dropped in temperature by heat exchange at HV radiator 2330, and a reservoir tank 2300.

Reservoir tank 2300 serves as an auxiliary tank of cooling water, provided to accommodate changes in temperature of cooling water in the pipes of this cooling system and changes in capacity of the pipes caused by the circulation of cooling water. More specifically, in the event that reservoir tank 2310 is not provided, an insufficient volume of cooling water with respect to the capacity of the cooling pipes will cause air to enter the cooling pipes. In such case, air entering the pipes of the cooling system will enter HV-water pump 2310, causing HV-water pump 2310 to be air-locked. Then, the cooling water could no longer circulate. To avoid such situation, reservoir tank 2310 is provided.

In the cooling system shown in FIG. 3, the cooling water circulates through HV radiator 2330, PCU 2200, reservoir tank 2300, HV-water pump 2310 and motor generator 140 in this order. PCU 2200 encloses therein an IPM for driving motor generator 140, and is therefore disposed in proximity to motor generator 140, as shown in FIG. 3. Accordingly, when engine 120 is mounted at the front side of the vehicle, motor generator 140 and PCU 2200 are disposed in proximity to engine 120.

It is to be noted that the position of motor generator 140 and PCU 2200 is not limited to that described above. Although the cooling system is described as being separate from a cooling system of engine 120, the cooling system controlled by the controllers according to the present invention is not limited to that described above. More specifically, the cooling system may share the cooling pipes with the cooling system of engine 120. Alternatively, a radiator may be shared while pipes are provided independently (in other words, the radiator of engine 120 also serves as the HV radiator), or any other mode of sharing may be adopted (e.g., sharing only a cooling fan between the radiators).

Figure 4:
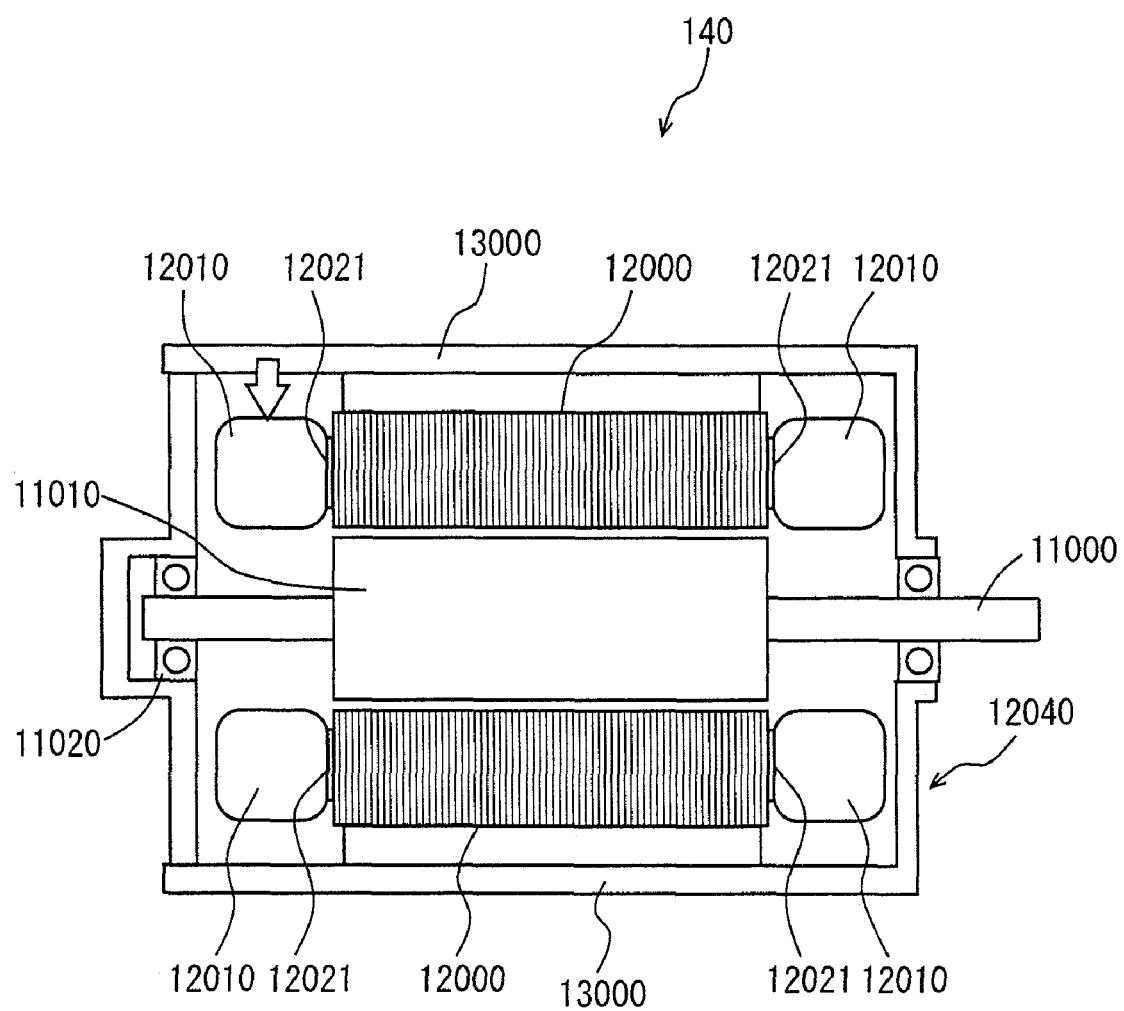
FIG. 4 is a sectional view of a motor generator according to an embodiment of the present invention.

With reference to FIG. 4, the internal structure of motor generator 140 having the cooling structure according to the embodiment of the present invention will now be described. Motor generator 140 is mounted on the above-described hybrid vehicle with the rotational shaft placed horizontally or substantially horizontally as shown in FIG. 4.

FIG. 4 is a cross-sectional view of such a motor generator 140. This motor generator includes a rotor section having a rotor 11010 rotatably supported by two bearings 11020 and a stator section having a stator core 12000 disposed on the periphery of rotor 11010. Rotor 11010 is supported by bearings 11020, and rotates about a rotational shaft 11000 to transmit a rotational torque to the powertrain of the vehicle (above-described power split mechanism 200).

Stator core 12000 is disposed at a position opposite to rotor 11010 leaving a narrow gap therebetween. Stator core 12000 has slots extending therethrough in a direction parallel to the rotational shaft, and a coil is wound running along the slots. A current flows through the coil to cause stator core 12000 to produce a magnetic field for rotating rotor 11010.

Ends of stator coil wound around stator core 12000 constitute stator coil ends 12010. The stator coil is wound running along the slots of stator core 12000 with an insulating paper 12021 interposed therebetween. Teeth are provided between the slots.

It is to be noted that rotor 11010 may be formed of a stack of a plurality of electromagnetic steel plates (thin plates of about 0.3 mm to 0.5 mm thickness), or may be an integral unit. The components including rotational shaft 11000, rotor 11010, bearings 11020, stator core 12000 and stator coil ends 12010 are enclosed in a housing 13000.

Stator coil 12040 wound around stator core 12000 shown in FIG. 4 is formed of a rectangular wire to constitute an edgewise coil. This rectangular wire has a greater radius of curvature when making turns than a round wire, resulting in a larger gap from the tooth of the stator (iron core) of the rotating electric machine. A primary feature of the cooling system according to the present embodiment is to utilize the gap as the channel of cooling medium (cooling water or cooling oil).

Figure 5:
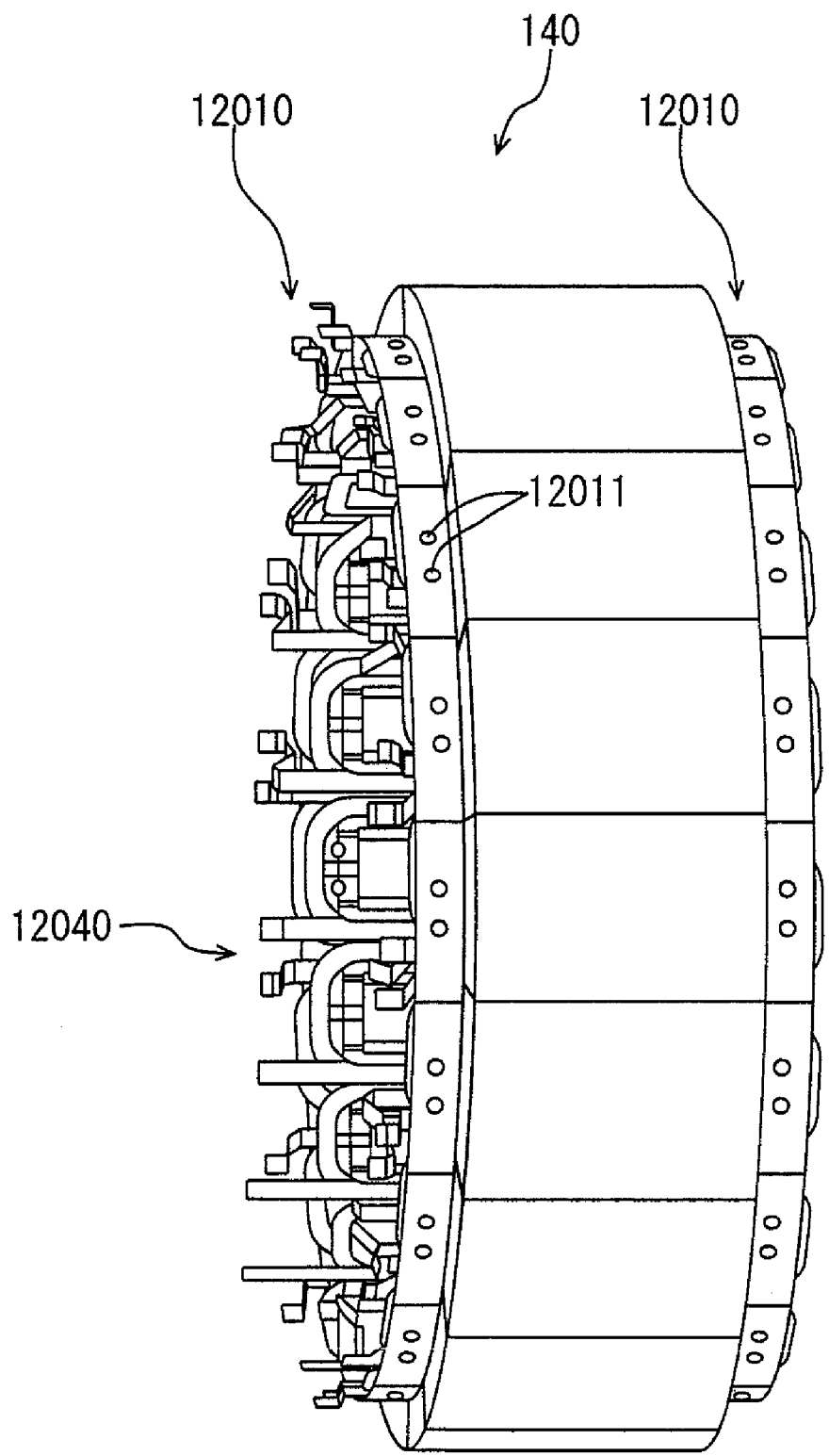
FIG. 5 is a perspective view of the motor generator according to an embodiment of the present invention.

FIG. 5 is a perspective view of motor generator 140 having the cooling system according to the embodiment of the present invention. Insulating plates (insulators) covering stator coil ends 12010 are provided with cooling water inlets 12011 leading to the gaps. The mode of stator coil ends 12010 varies depending on the number of poles of motor generator 140, for example. In the present embodiment, a set of two inlets are provided for each insulating plate.

FIG. 6 is an enlarged view of a portion including an edgewise coil corresponding to one pole. FIG. 7 is a sectional view corresponding to FIG. 6. As shown in FIGS. 6 and 7, a rectangular wire 12050 is wound around tooth 12018 to constitute an edgewise coil. As shown in FIG. 7, it is difficult to wind rectangular wire 12050 around rectangular tooth 12018 with no gaps therebetween (difficult to wind rectangular wire 12050 having a rectangular cross section exactly into rectangle with no gaps therebetween). However, as shown in FIG. 7, supporting portions 12013 are provided for determining the position of the edgewise coil relative to tooth 12018. This results in a cooling water channel 12012 between the edgewise coil formed of rectangular wire 12050 and tooth 12018 (more precisely, with insulating materials (insulators) interposed therebetween).

Cooling water inlets 12011 shown in FIG. 6 correspond in position to cooling water channel 12012 shown in FIG. 7. Accordingly, supplying the cooling water (LLC) to cooling water inlets 12011 (from the external side of motor generator 140 toward the rotational shaft (to the inner or central side)) allows the cooling water to flow through cooling water channel 12012. This allows direct cooling of the edgewise coil with the cooling water.

Figure 8:
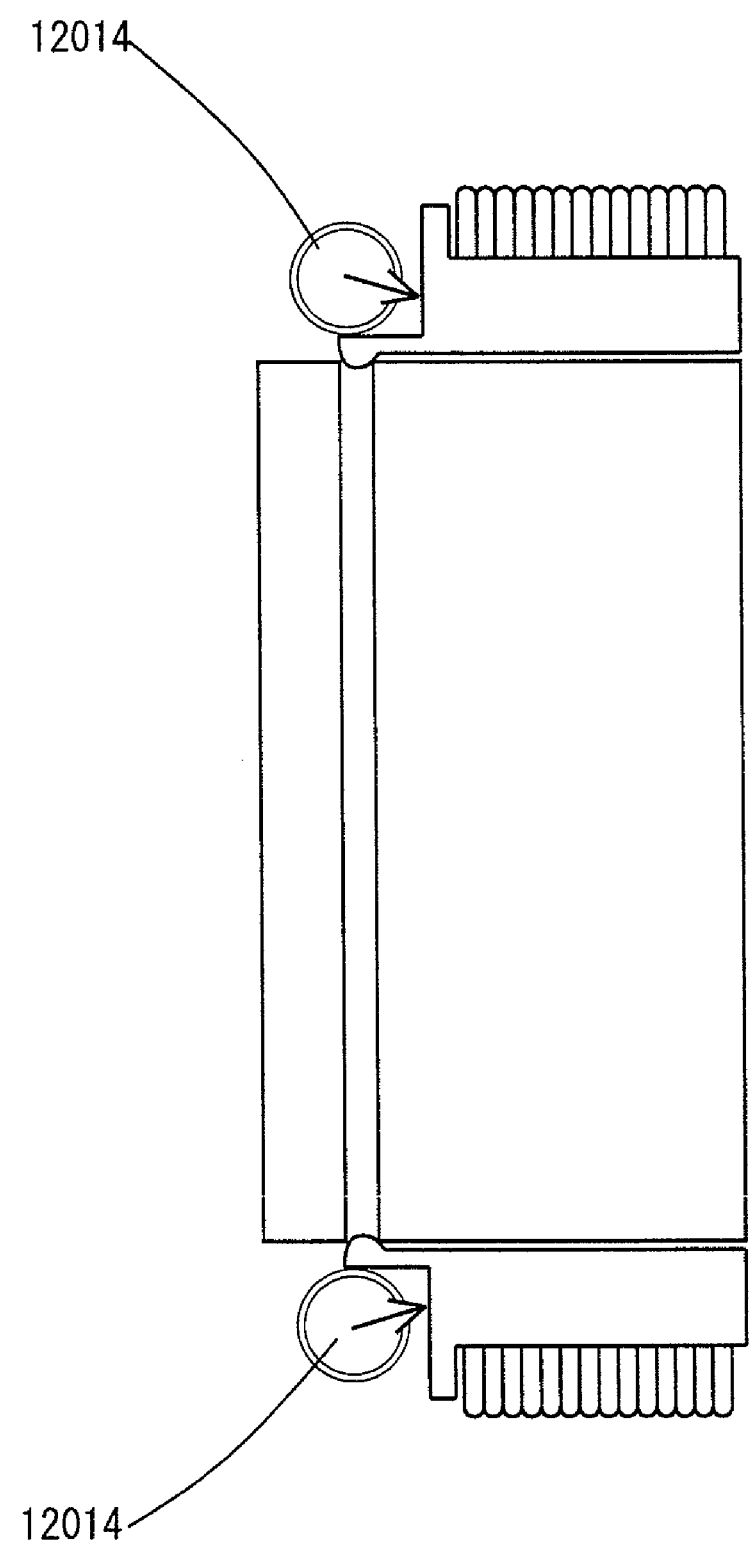
FIG. 8 is a side view of a motor generator (provided with cooling pipes) according to an embodiment of the present invention.
Figure 9:
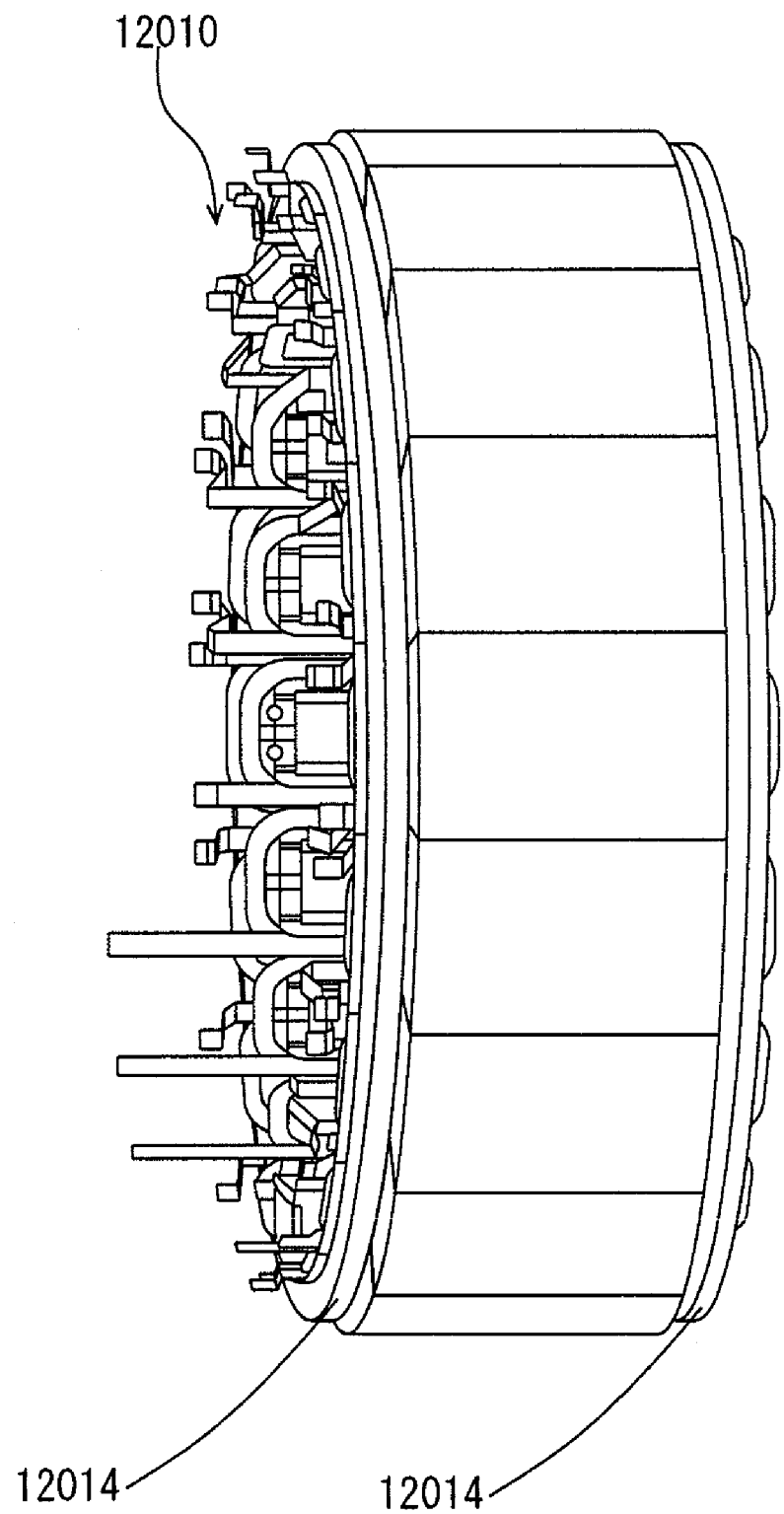
FIG. 9 is a perspective view of the motor generator provided with the cooling pipes corresponding to FIG. 8.

With reference to FIGS. 8 and 9, the supply of the cooling water in motor generator 140 will now be described. As shown in FIGS. 8 and 9, cooling water inlets 12011 shown in FIG. 5 are provided along the entire circumference of stator coil ends 12010 of motor generator 140. Cooling-water supply pipes 12014 are provided along the entire circumference of stator coil ends 12010 in a manner covering cooling water inlets 12011 provided along the entire circumference. Cooling-water supply pipes 12014 have outlets corresponding in position to cooling water inlets 12011. As indicated by arrows in FIG. 8, the cooling water discharged through the outlets passes through cooling water inlets 12011 to flow into cooling water channel 12012. Since the cooling water flows from the top to bottom of motor generator 140 by gravity, the outlets may be provided only at the top side of cooling-water supply pipes 12014.

As described above with reference to FIG. 3, the present hybrid cooling system is configured to circulate the cooling water by means of HV-water pump 2310 to dissipate, at HV radiator 2330, the heat having been absorbed at motor generator 140. Accordingly, the cooling water flowing through cooling water channel 12012 opened from the external side to the central side of motor generator 140 shown in FIG. 4 passes through a drain hole (not shown) provided at the bottom of motor generator 140 and flows through HV-radiator-destined pipe 2320 to be fed into FW radiator 2330.

Figure 10A:
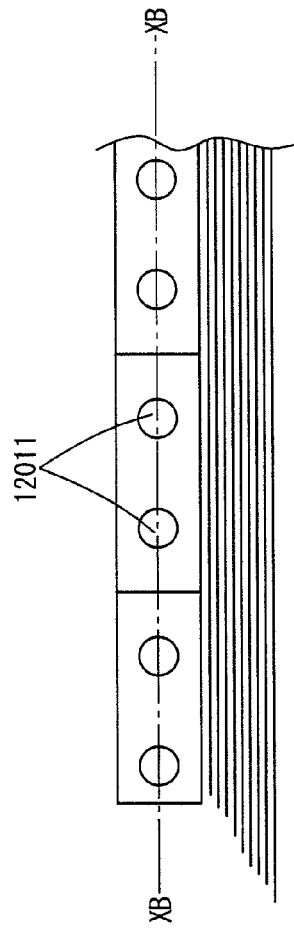
FIG. 10A shows a stator coil end 12010 viewed from the top of a motor generator 140, representing a (first) manner in which cooling water flows.
Figure 10B:
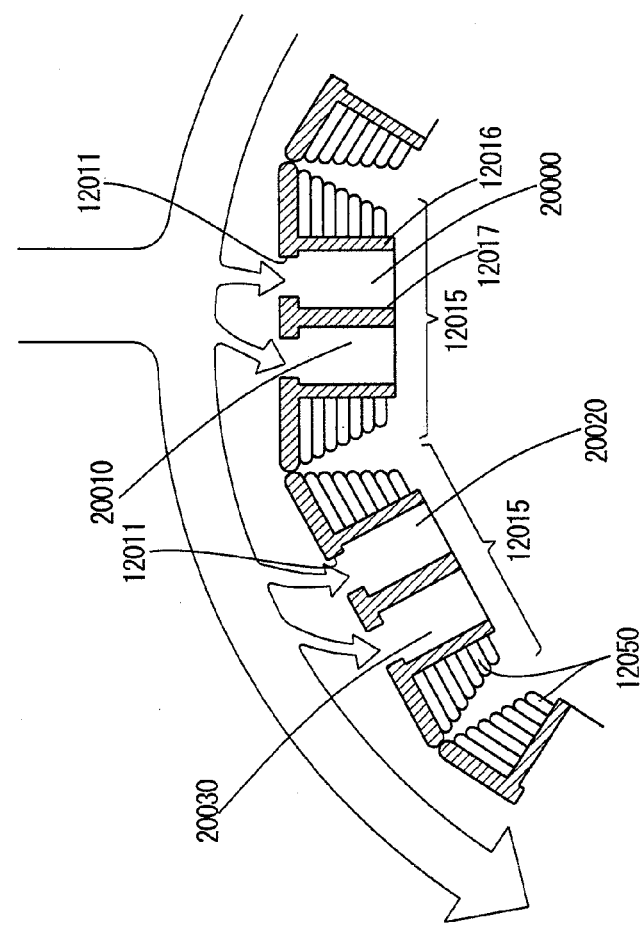
FIG. 10B is a sectional view taken along the line XB-XB in FIG. 10A.

With reference to FIGS. 10A and 10B, the flow of cooling water will be described. FIG. 10A is a diagram of stator coil end 12010 viewed from the top of motor generator 140, showing cooling water inlets 12011 provided in the insulating plates.

FIG. 10B is a sectional view taken along the line XB-XB in FIG. 10A. As shown in FIG. 10B, a plurality of edgewise coils 12015 (stator coil ends 12010) are provided for each pole. The cooling water flowing into cooling water channels 20000, 20010, 20020 and 20030 formed by insulators 12016 and 12017 exchanges heat with the stator coils to lower the temperature of the stator coils.

Figure 11A:
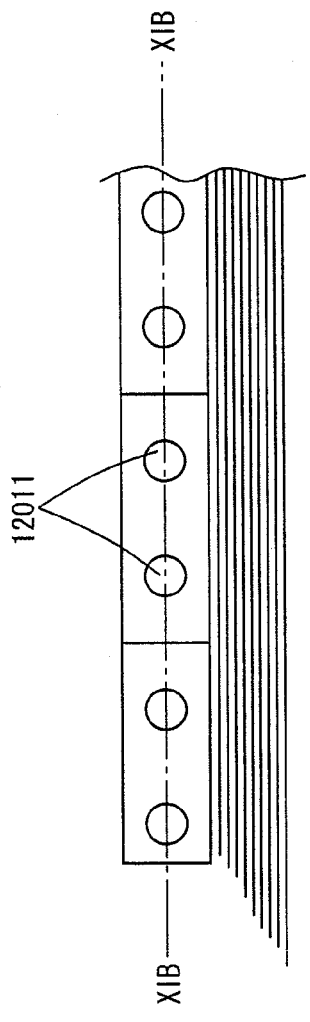
FIG. 11A shows stator coil end 12010 viewed from the top of motor generator 140, representing a (second) manner in which cooling water flows.
Figure 11B:
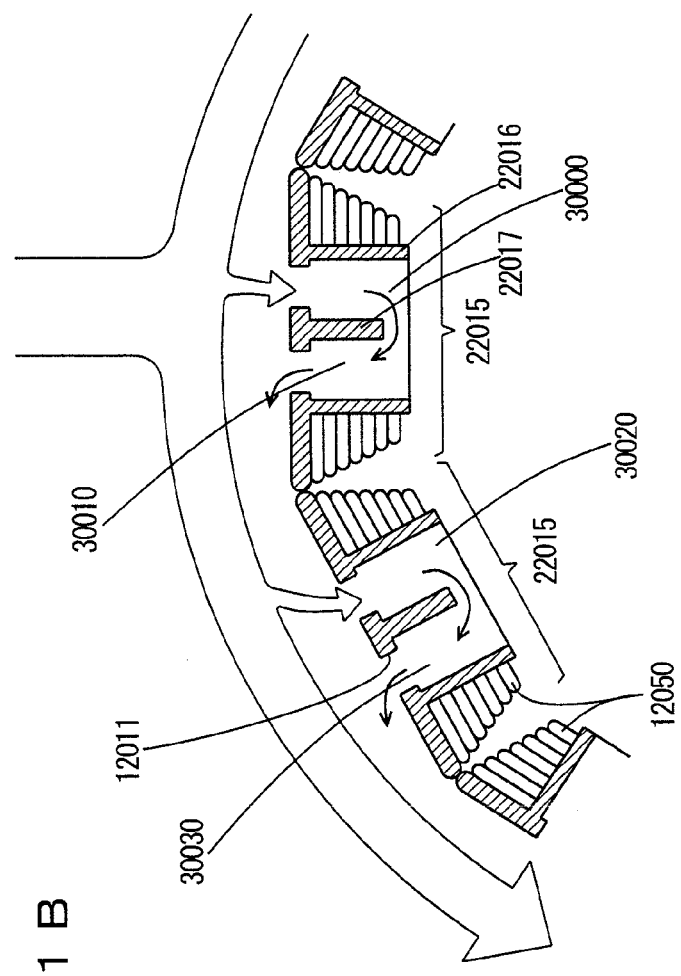
FIG. 11B is a sectional view taken along the line XIB-XIB in FIG. 11A.

With reference to FIGS. 11A and 11B, the flow of cooling water when an edgewise coil 22015 has an insulator 22017 of a different shape from insulator 12015 will be described. Similarly to FIG. 10A, FIG. 11A is a diagram of stator coil end 12010 viewed from the top of motor generator 140, showing cooling water inlets 12011 provided in the insulating plates. FIG. 11B is a sectional view taken along the line XIB-XIB in FIG. 11A.

In edgewise coil 22015 (stator coil ends 12010), insulator 22017 is shorter than insulator 12017 shown in FIGS. 10A and 10B. Therefore, the cooling water flowing into a cooling water channel 30000 through one of a set of two cooling water inlets 12011 flows into a cooling water channel 30010 communicating with the other cooling water inlet 12011. Further, the cooling water discharged from cooling water channel 30010 flows into a cooling water channel 30020 through one of cooling water inlets 12011 of another edgewise coil located downward to flow into a cooling water channel 30030 communicating with the other one of cooling water inlets 12011. Furthermore, the cooling water discharged from cooling water channel 30010 flows into another edgewise coil located downward. The cooling water flowing sequentially into cooling water channels 30000, 30010, 30020 and 30030 each being formed by insulators 22016 and 22017 exchanges heat with the stator coils to lower the temperature of the stator coils.

As described above, the motor generator having the cooling structure according to the present embodiment is configured to flow the cooling water through the gaps resulting from a great radius of curvature when the edgewise coil is formed of the rectangular wire having a great radius of curvature at turns. This allows direct cooling of the stator coil to achieve improved thermal properties of the motor generator.

Modification

With reference to FIG. 12, a modification of the motor generator having the cooling structure according to the embodiment of the present invention will be described.

FIG. 12 corresponds to FIG. 7 (although different in orientation). A difference from the cooling structure shown in FIG. 7 is that, in place of supporting portions 40010, an insulator 40002 is added to an insulator 40000, and a supporting portion 40010 is provided thereon.

More specifically, a cooling water channel 40030 narrower than cooling water channel 12012 is obtained. A rectangular wire member 40020 is arranged to surround cooling water channel 40030. Such narrower cooling water channel brings about a higher flow rate of cooling water. This achieves improved heat exchange efficiency, leading to higher cooling performance.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:

1. A cooling structure for a rotating electric machine, comprising:
    a plurality of coils with a rectangular wire wound in multiple layers around an insulating member circumferentially covering a core, in each of said plurality of coils, a gap being provided between said insulating member and said rectangular wire; and
    a supply portion for supplying a cooling medium to flow through said gap.

2. The cooling structure for a rotating electric machine according to claim 1, wherein said cooling medium flows from one of said plurality of coils to another coil.

3. The cooling structure for a rotating electric machine according to claim 1, further comprising an insulating material reducing a cross-sectional area of said gap.

4. The cooling structure for a rotating electric machine according to claim 1, wherein said supply portion includes
    a channel supplying said cooling medium to a hole communicating with said gap, and
    a pump causing said cooling medium to flow through said channel.

5. The cooling structure for a rotating electric machine according to claim 4, wherein said channel has an outer peripheral surface of a contour conforming to a curved inner peripheral surface of said rectangular wire.

6. The cooling structure for a rotating electric machine according to claim 1, wherein said cooling medium includes liquid.

\* \* \* \* \*